United States Patent [19]

Day et al.

[11] 3,779,387
[45] Dec. 18, 1973

[54] FILTER
[75] Inventors: John J. Day; Paul S. Hirschman, both of Fort Lauderdale, Fla.
[73] Assignee: Ocean Protein Corporation, Dania, Fla.
[22] Filed: Oct. 20, 1971
[21] Appl. No.: 190,756

[52] U.S. Cl.................. 210/232, 210/279, 210/281
[51] Int. Cl............................................. B01d 29/10
[58] Field of Search................... 210/232, 169, 281, 210/282, 275, 279

[56] References Cited
UNITED STATES PATENTS

| | | | |
|---|---|---|---|
| 2,743,230 | 4/1956 | Meyer | 210/281 |
| 2,007,068 | 7/1935 | Beck | 210/281 |
| 3,625,365 | 12/1971 | Armstrong | 210/232 |
| 3,347,385 | 10/1967 | Russell | 210/232 |
| 3,178,024 | 4/1965 | Jacuzzi | 210/169 X |
| 3,080,976 | 3/1963 | Thompson et al. | 210/232 |
| 2,067,302 | 1/1937 | Pick | 210/281 |
| 3,276,588 | 10/1966 | Nehrbass et al. | 210/169 |

*Primary Examiner*—Samih N. Zaharna
*Assistant Examiner*—T. A. Granger
*Attorney*—Darby et al.

[57] ABSTRACT

A filter having a container made of a substantially inert material which has fittings fastened thereto. Various operating portions of the filter are attached to the fittings in a way such that they can be easily removed and access had to the interior of the filter container for cleaning the container or charging it with a fluid medium.

7 Claims, 1 Drawing Figure

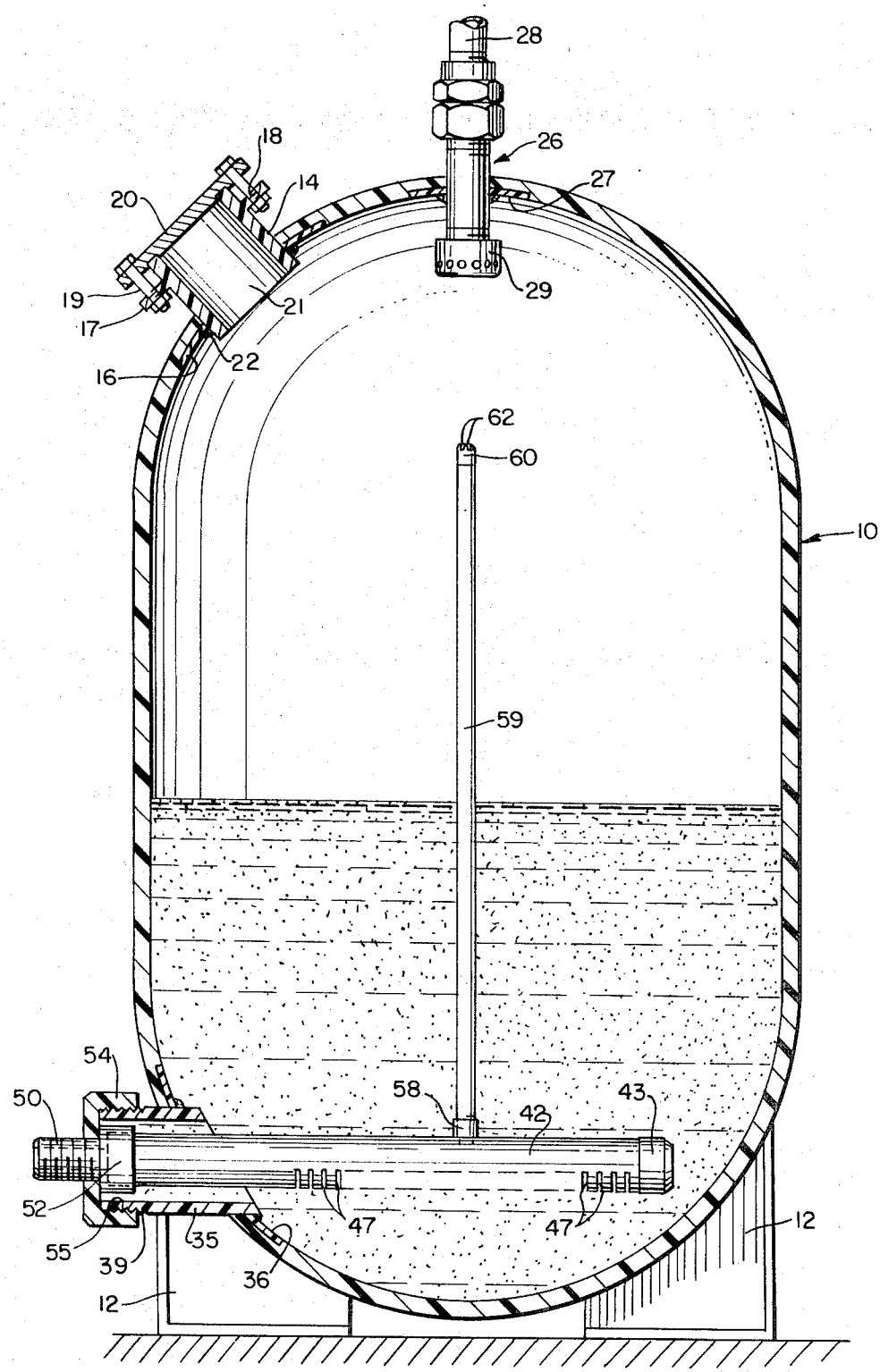

FILTER

Filters for treating fluids, such as water, for the removal of particulate contaminants are well known. The present invention relates to a filter for treating fluids which is relatively simple in construction and is made substantially entirely of all non-metallic materials.

In accordance with the invention a filter is provided whose container is made of Fiberglass, or some other suitable inert material of comparable strength. A plurality of fittings, which are preferably of a synthetic material such as a suitable polyvinyl type plastic, are attached to the container in a manner which provides a strong bond between the two. Various components of the filter system, such as fluid inlet and outlet coupling members and an air bleeder pipe are provided which are attached to the fittings. In the preferred embodiment of the invention, the attachment for some of these is made in a way so that the various components can be disassembled. This makes the filter easier to fabricate and clean.

It is therefore an object of the present invention to provide novel filters for cleansing fluid which are made substantially of inert materials.

A further object is to provide a filter in which fittings are attached to flange members which are in turn attached to the filter housing in a manner to provide a strong bond between the fittings and the container.

An additional object is to provide a novel filter in which various internal parts thereof can be readily assembled or disassembled while located in the filter container.

Other objects and advantages of the present invention will become more apparent upon reference to the following specification and annexed drawings, in which:

The sole FIGURE is an elevational view of the filter, partly in cross-section.

Referring to the drawing, the filter of the present invention comprises a main housing, or container, 10 which preferably is formed of a strong and inert non-metallic material. One such suitable material is Fiberglass. Where Fiberglass is used, the housing 10 can be molded in several sections, for example two, and then joined together by a further molding or treating step. As shown, the container 10 is of generally elongated shape with semi-spherical ends. Of course, it can be made of any desired shape. The container 10 rests on a suitable base member 12 which can be of any desired shape or material construction. The base member 12 forms no part of the present invention.

A first fitting 14 is located at the top end of the filter. The fitting 14 has a flange 16 attached adjacent its end which is located within the container. This flange is used to attach and hold the fitting to the container. The details of the attachment are described in greater detail below since they are common to all of the fittings to be described.

Fitting 14, as are the other fittings and components of the filter, is made of a suitable inert plastic material. One suitable material is polyvinyl chloride plastic (PVC). The fitting is of generally tubular shape and a ring flange 17 is attached to its upper end. The ring flange 17 also can be of PVC and it is fastened to fitting 16 by any suitable means, for example, by an adhesive. The ring flange 17 is formed with a number of openings 18 each of which accepts a headed nut and bolt combination 19 to hold a cover plate 20 over the opening of fitting 16. The head of the bolt rests on the top surface of the fitting 14.

Fitting 14 serves as a charging port 21 for the filter medium 22 which is located within the filter container. Thus, the diameter of port 21 is selected to be suitably wide, for example, in the order of about three-five inches, or somewhat greater so that a human hand or some other instrument can be inserted through the port. The port 21 is sealed by the cover plate 20. This can be of metal, if desired, since it does not come into direct contact with the fluid being treated.

The filter medium 22 can be of any suitable material, for example, sand for a gross filter or fine charcoal. The filter medium is charged to approximately one-third to one-half the height of the container.

A second fitting 26 is located at the top end of the container. This fitting also has a flange 27 attached to it on the inside of the container to fasten the fitting to the container. The fitting 26 is a nipple which is threaded on both ends. The thread on the outside of the container has a hose or pipe 28 coupled to it which supplies the water or other liquid to be filtered. A spray header 29 is attached to the thread on the end of the nipple inside of the container. The header can be of any suitable shape such as round, square, etc. It is used to spray the untreated liquid more or less uniformly over the entire upper surface area of the body of filter medium. As should be apparent, the spray header can be assembled to or removed from the fitting by reaching into the container through port 21. This makes it easy to clean the header if it clogs.

A third tubular fitting 35 is located at the bottom of the container 10. This fitting has a flange 36 for attaching it to the container 10. The end of fitting 35 external of the container 10 has threads 39. A pipe 42 is passed through fitting 35 into the interior of the container. The right end of the pipe inside of the container is closed by a cap 43. The central portion of the pipe which is located within the container 10 when the filter is fully assembled has a number of slits or holes 47 on its lower surface. A threaded nipple 50 is attached to the left end of pipe 42 outside of the container by an adapter 52. The adapter and nipple are both attached to an outer cap 54 which has internal threads 55 so that the cap can be threaded onto the fitting 35. The cap seals fitting 35 so that fluid communication to the pipe 42 is through the nipple 50. The pipe 42, nipple 50, adapter 52 and cap 54 are also preferably of PVC. All four can be joined together by a suitable adhesive. As an alternative, only nipple 50, adapter 52 and cap 54 can be joined together. A coupler 58, which can have either male or female threads, is attached at an intermediate point of pipe 42 to have fluid communication with the interior of the pipe. A bleeder pipe 60 having a threaded lower end threads into coupler 58. A cap 60 slips into or over the top of pipe 59 and has one or more holes 62 in its upper end.

In manufacturing a container of the type disclosed herein, the openings through which the various fittings extend weaken the container's structural integrity. Further, the fittings must be attached in a way such that they will stay bonded to the container and not cause any leaks.

In accordance with the subject invention, each of the fittings 14, 26 and 35 is formed with the respective flange 16, 27 and 36. The flanges are attached to the respective fittings. It is preferred that this attachment be made as securely as possible. It can be accomplished by a suitable solvent which forms a molecular bond between the fitting and the flange. If desired, excess plastic material can be built up as a fillet at the area where the fitting is joined to the flange. One such fillet 17 is shown between the fitting 14 and flange 16. As an alternative to this, each fitting and its respective flange can be molded together. The molding can either initially make the fitting and flange as a single unit or else mold together separate fitting and flange pieces.

Each of the fittings and its respective flange piece is molded onto the inner wall of the container 10 during the fabrication of the latter. As seen in FIG. 1, each of the flanges is integrally formed into the wall of the container at one of its surfaces. Thus, there is a good structural bond between the two.

As should be apparent, the filter of the present invention is relatively easy to fabricate. The container 10 is formed with the respective fittings 14, 26 and 35 attached to it. The assembly including pipe 42 and nipple 50 are passed through fitting 35 and the cap 54 threaded onto the fitting to form the seal. The bleeder pipe 59 can then be passed through port 21 in fitting 14 and threaded into the coupler 58. The spray head 29 can be threaded onto the end of fitting 26 through port 21. The filter medium is then charged into the container through port 21 and the port is then sealed by cover 20.

In operation, the fluid to be filtered passes from pipe 28 through inlet fitting 26. This fluid is sprayed through the head 29 onto the filter medium 22. The fluid filters down through the medium and it is cleansed. It then passes through the openings 47 in the bottom of the pipe 42. The location of the openings 47 on the bottom of pipe 42 prevent floating particles of unwanted material from passing to the outlet. The cleansed fluid leaves the filter through a pipe or hose (not shown) which is attached to nipple 50. The bleeder pipe 59 bleeds off air which is trapped in the filter medium.

The filter is cleaned by back-flushing. A cleaning fluid, such as water, is supplied through the pipe 42. This water passes out through the openings 47 and up through the filter medium 22. The material trapped in the medium is floated free and passes out through the inlet fitting 26.

The filter medium can be replaced by removing cover 20 of port 21 and taking out the medium through the port. New medium is added through the same port.

As should be apparent, spray head 29 can be removed for cleaning through port 21 as can the bleeder pipe 59. Pipe 42 can be removed for cleaning by unscrewing the cap 54.

The filter of the subject invention has no metal components which are in contact with the fluid being filtered. Therefore, there is no problem of rusting or corrosion of parts. The filter is highly efficient yet is relatively simple and economical to manufacture.

What is claimed is:

1. A filter for treating fluids comprising a substantially rigid closed container, a charge of a filter medium in said container, first, second and third fittings, each said fitting extending through an opening in said container for providing communication between the interior and the exterior of the container, each said fitting including a flange wall bonded thereto, each said flange wall also being bonded to said container for sealing the opening through which the fitting extends and for firmly attaching said fitting to said container, said container and said first, second, and third fittings being constructed from Fiberglass or plastic material, fluid inlet means connected to said first fitting and having a portion exterior of said container to which a fluid supply means can be connected and a portion interior of said container normally located above the charge of the filter medium for discharging the fluid to be filtered to said filter medium, said second fitting means defining a port through which access can be had to the interior of the container, detachable cover means secured to said second fitting means, first conduit means passing through said third fitting means and having a first portion which is located within said container normally within the charge of filter medium and a second portion exterior of said container through which the filtered fluid is discharged, a plurality of openings in said first portion of said first conduit means, and detachable means exterior of said container for coupling between said first conduit means and said third fitting means, said detachable means when coupled to said third fitting sealing off said third fitting while permitting fluid communication with the interior of said container through said first conduit means and said detachable means when removed from said third fitting permitting said first conduit means to be removed from said container through said third fitting.

2. A filter as in claim 1 wherein said container is of Fiberglass.

3. A filter as in claim 1 wherein said flange wall of each said fitting is molded to the interior wall of said container.

4. A filter as in claim 1 wherein the portion of said fluid inlet means interior of said container includes a spray head detachably coupled to said first fitting means interior of the container, said spray head being accessible and detachable through the port defined by said second fitting.

5. A filter as in claim 1 further comprising second conduit means and having an inlet opening located within said container above the charge of filter medium in said container means for detachably connecting said second conduit means to said first conduit means interiorly of said container and providing fluid flow communication between the two, said second conduit means being accessible and detachable from said first conduit means through the port defined by said second fitting.

6. A filter as in claim 5 further comprising a first said fitting whose flange wall is structurally bonded to said container, said first fitting including means exterior of the container to which a fluid supply means can be coupled and means interior of said container, a spray head detachably coupled to said first fitting means interior of the container, said spray head being accessible and detachable through the port defined by said second fitting.

7. A filter as in claim 1 wherein said flange wall is structurally bonded to said fitting by an adhesive.

* * * * *